United States Patent [19]

Pham et al.

[11] Patent Number: 4,750,116

[45] Date of Patent: Jun. 7, 1988

[54] HARDWARE RESOURCE MANAGEMENT

[75] Inventors: Xuan N. Pham; John H. Wilson, both of Austin, Tex.

[73] Assignee: International Business Machines Corporation, Armonk, N.Y.

[21] Appl. No.: 786,913

[22] Filed: Oct. 11, 1985

[51] Int. Cl.[4] .............................................. G06F 9/46
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,916,383 | 10/1975 | Malcolm | 364/200 |
| 4,001,784 | 1/1977 | Bardotti | 364/200 |
| 4,096,571 | 6/1978 | VanderMey | 364/200 |
| 4,224,664 | 9/1980 | Trinchieri | 364/200 |
| 4,393,459 | 7/1983 | Huntley et al. | 364/900 |
| 4,399,504 | 8/1983 | Obermarck et al. | 364/200 |
| 4,481,583 | 11/1984 | Mueller | 364/300 |
| 4,514,728 | 4/1985 | Ahuja | 340/825.5 |
| 4,584,644 | 4/1986 | Larner | 364/200 |

Primary Examiner—Eddie P. Chan
Attorney, Agent, or Firm—Andrea P. Bryant; J. F. Villella, Jr.

[57] ABSTRACT

An application programming interface enables system hardware resources to interact with application programs to provide a plurality of signal processing functions. Conflicting resource requirements by the application programs are detected. An application may preempt a currently executing application by claiming the hardware resources currently in use. The application from which resources have been claimed is identified so that it may be resumed when the required resources become once again available. Before the resources from a given application are claimed by another application, the user is provided a warning so that he may alter the order in which the applications are run.

7 Claims, 6 Drawing Sheets

HARDWARE RESOURCE MANAGEMENT

TECHNICAL FIELD

This invention relates to the managing of hardware resources in an information processing system, and more particularly, to the allocation of the hardware resources among a plurality of contending application programs.

BACKGROUND ART

In the data processing environment, hardware resources are shared among a plurality of software applications executing in the system. It is not uncommon for more than one application to simultaneously require the same hardware resource. Since more than one application cannot use the same hardware resource simultaneously, means must be provided to overcome this contention problem. Various techniques have been proposed to overcome this hardware contingent problem.

In one approach, a priority level is assigned to each contending application that wishes to use the hardware resources of the system. When two or more applications require simultaneous execution, a determination is made as to which application has the highest priority. The application with the highest priority is then allowed to execute using the required hardware resources. The lower priority application then waits until the hardware resources are no longer required by the highest priority application before executing. A problem with this approach is that it tends to favor higher priority applications over lower priority applications, thereby delaying the execution of low priority applications significantly.

One technique for overcoming this problem is to grant priority to an application in accordance with the length of time that an application has been waiting to be executed in comparison with other waiting applications. In another known technique, priority is granted to the application having the shortest anticipated execution time. For example, in U.S. Pat. No. 4,096,571, a processor's waiting time is minimized by precluding any processor from reaching the memory twice before another processor which has in the meantime requested the memory reaches it once. In yet another approach disclosed in U.S. Pat. No. 4,481,583, programs are executed through a series of processing intervals. After each interval, the priority of the executing program is lowered in proportion to the amount of resources consumed. After each processing interval, the priorities are recalculated for all programs competing for access to the same resources.

In U.S. Pat. No. 4,514,728, the problem of low priority lockout is addressed. Low priority lockout can occur for example when two high priority devices alternate in contention for the same resource simultaneously with a lower priority device. These contentions are never resolved in favor of the lower priority device, thereby locking it out from access to the required resource. In accordance with this patent, all requests at a given time for a resource are stored. No further requests are honored until each device associated with a stored request is granted access to the resource. In this manner, the lower priority device is not locked out.

A problem not addressed by the prior art occurs when a user desires to start an application that preempts the resources currently being used by another application. Means must be provided to determine which resources each application requires and which resources are currently available. Additionally, the user must be warned if an application is about to terminate because its resources are rquired to run another application. Additionally, provision must be made for the interrupted application to be allowed to continue to execute following the completion of the interrupting application. In an environment when more than one application can run at a time, then means must still be provided to keep track of the required resources and to allocate them among the functioning applications. Finally, it would be most desirable to enable a system to detect conflicting usages by competing applications of the same hardware resources in such a manner to enable the system to help the user make the correct decision as to which application to execute first.

SUMMARY OF THE INVENTION

It is an object of this invention to provide an improved method and apparatus for managing hardware resources in an information processing system.

It is another object of this invention to detect conflicting usages of hardware resources by competing applications in such a manner as to enable a user to determine which application to execute on a priority basis.

In accordance with these and other objects of the invention, a method and apparatus are provided for enabling independent application programs that require simultaneous use of the same hardware resources of a multi-function signal processing system to recognize when they are using or wish to use conflicting resources. A user is allowed to start an application that preempts the resources currently being used by another application. The application from which resources have been stolen is identified so that it may be resumed when the required resources become available once again. Before the resources from a given application are stolen by another application, the user is provided a warning so that he may alter the order in which the applications are run.

The signal processing system of the present invention provides the functions of voice recognition, text-to-speech conversion, voice storage and playback, telephony, and asynchronous communication with modem communication. The hardware resources include two ports or channels, two telephone lines, one telephone, one speaker, one microphone, and two partitions in an instruction memory for providing the above-identified functions. In addition to the hardware resources, there are also interrupt resources implemented in software. These interrupt resources include means for handling ring-in on both telephone lines and a handset on/off cradle for the telephone resource.

An application communicates with the signal processing system through a host across an application programming interface. Signal processing code executes on a signal processor under the control of a multi-tasking, interrupt-driven control program that resides in a third partition of the instruction memory. This signal processor control program manages the instruction memory in partitions and allows the signal processor code in the partitions to run concurrently. The signal processing code in a partition corresponds to a function set in the application programming interface. A function set includes two software files; the one corresponding to the signal processing code, and the other to the host processing system. The application programming interface subsystem loads the signal processor code into the appropriate partition in response to application programming interface commands from the application. The function sets in the interface include telephony, line monitoring, asynchronous communications, audio input and output, speech synthesis (text-to-speech), and speech recognition.

BEST MODE FOR CARRYING OUT THE INVENTION

Figure 1:
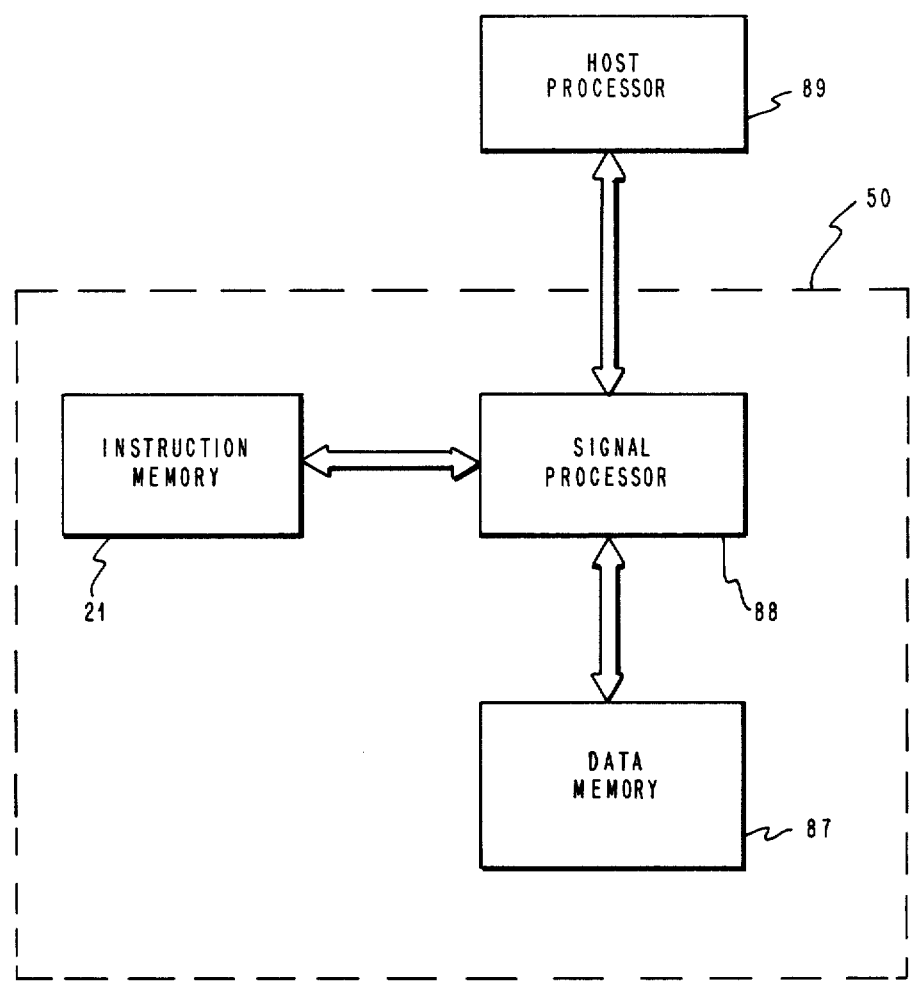
FIG. 1 is a simplified functional block diagram of the signal processing system of the present invention.

A simplified functional block diagram of the signal processing system 50 is shown in FIG. 1. Signal processor 88 may be any commercially available signal processor such as the Texas Instruments TMS32010. Signal processor 88 is totally controlled by host processor 89 and must have its central processing unit (CPU) instructions loaded before operation. Signal processor 88 uses instruction memory 21 as well as data memory 87. Both of these memories are accessible by host processor 89 although not at the same time as signal processor 88. Instruction memory 21 is accessible by host processor 89 only when signal processor 88 is turned off, i.e, reset. At that time, host processor 89 can load from instruction memory 21 and then switch to data memory 87 which is shared at all times dynamically with signal processor 88. Both signal processor 88 and host processor 89 have the capability to interrupt one another with interrupt masking under control of host processor 89.

Figure 2:
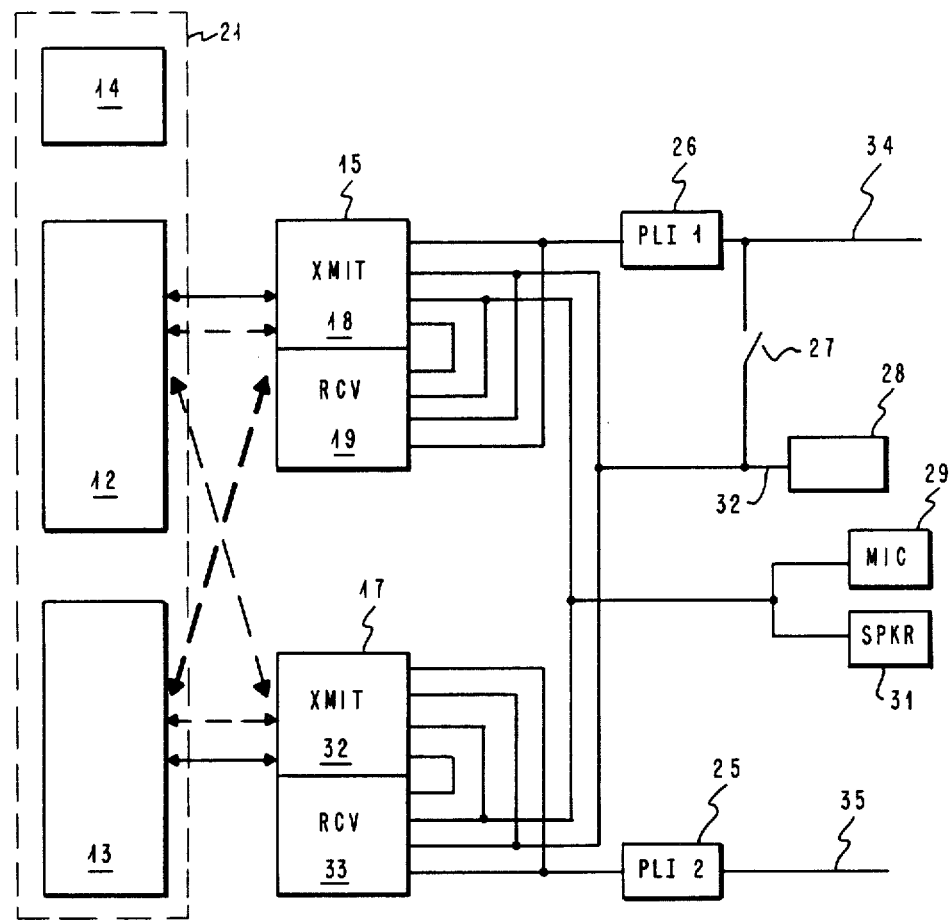
FIG. 2 is a block diagram of the hardware resources of the signal processing system according to the present invention.

The resources available to the signal processing system are shown in FIG. 2. Partitions 12, 13, and 14 are contained within instruction memory 21 (see FIG. 3). Partition 14 is loaded when the processing system is initialized and provides functions to manage the resources of the signal processing system. Partition 12 may contain either the telephony or line monitoring function sets. The telephony function set provides the capability to dial phone numbers on lines 34 and 35 and to monitor the progress of an outbound telephone call as it is being placed. The line monitoring function set allows an application program to be notified of incoming signals that are generated by telephone equipment after a call has been established.

Partition 13 may contain any one of the function sets to provide audio input and output, speech synthesis (text-to-speech), speech recognition, and asynchronous communications with modem communication. The audio input function set provides the capability to receive audio input, digitize and compress it and store it in data memory 87 (FIG. 1). The audio output function basically does the reverse of the audio input function whereby an audio output signal is reconstructed from a digitized compressed signal. The speech synthesis function set provides a means of generating intelligible speech from an ASCII text string. The speech recognition function set provides its capability of recognizing previously trained utterances. The asynchronous communications function set provides the capability to send and receive data over a telephone line, such as lines 34 and 35, using the normal asynchronous protocols.

In addition to telephone lines 34 and 35 previously mentioned, telephone 28 as well as microphone 29 and speaker 31 are provided. Microphone 29 enables a user to input audio information into the digital processing system while speaker 31 enables audio output signals to be heard. Line 32 provides an on/off cradle indication to signify the status of telephone 28. When the handset of phone 28 goes off cradle, relay 27 closes thereby enabling a telephone call to be placed on line 34. Phone line interface 26 provides an interface to telephone line 34 while phone line interface 25 forms an interface for telephone line 35. Phone line interfaces 25 and 26 are not considered to be hardware resources of the signal processing system 50.

The final two hardware resources are ports 15 and 17. Port 15 contains a transmitter 18 and receiver 19 and similarly, port 17 contains a transmitter 32 and a receiver 33. Telephone 28, microphone 29, speaker 31, and telephone lines 34 and 35 are multiplexed through ports 15 and 17 which are in turn multiplexed to a single pair of A/D and D/A convertors. The A/D and D/A conversion does not form a part of this invention and will not be discussed further hereinafter. Ports 15 and 17 can be accessed by either partition 12 or 13. Additionally, both partitions 12 and 13 can access the same port.

In addition to the hardware resources, as previously mentioned, there are three interrupt resources which an application can use. The first two interrupt resources handle ring-in interrupts on lines 34 and 35 respectively. The third interrupt resource handles the telephone handset on/off cradle which is provided by line 32.

Figure 3:
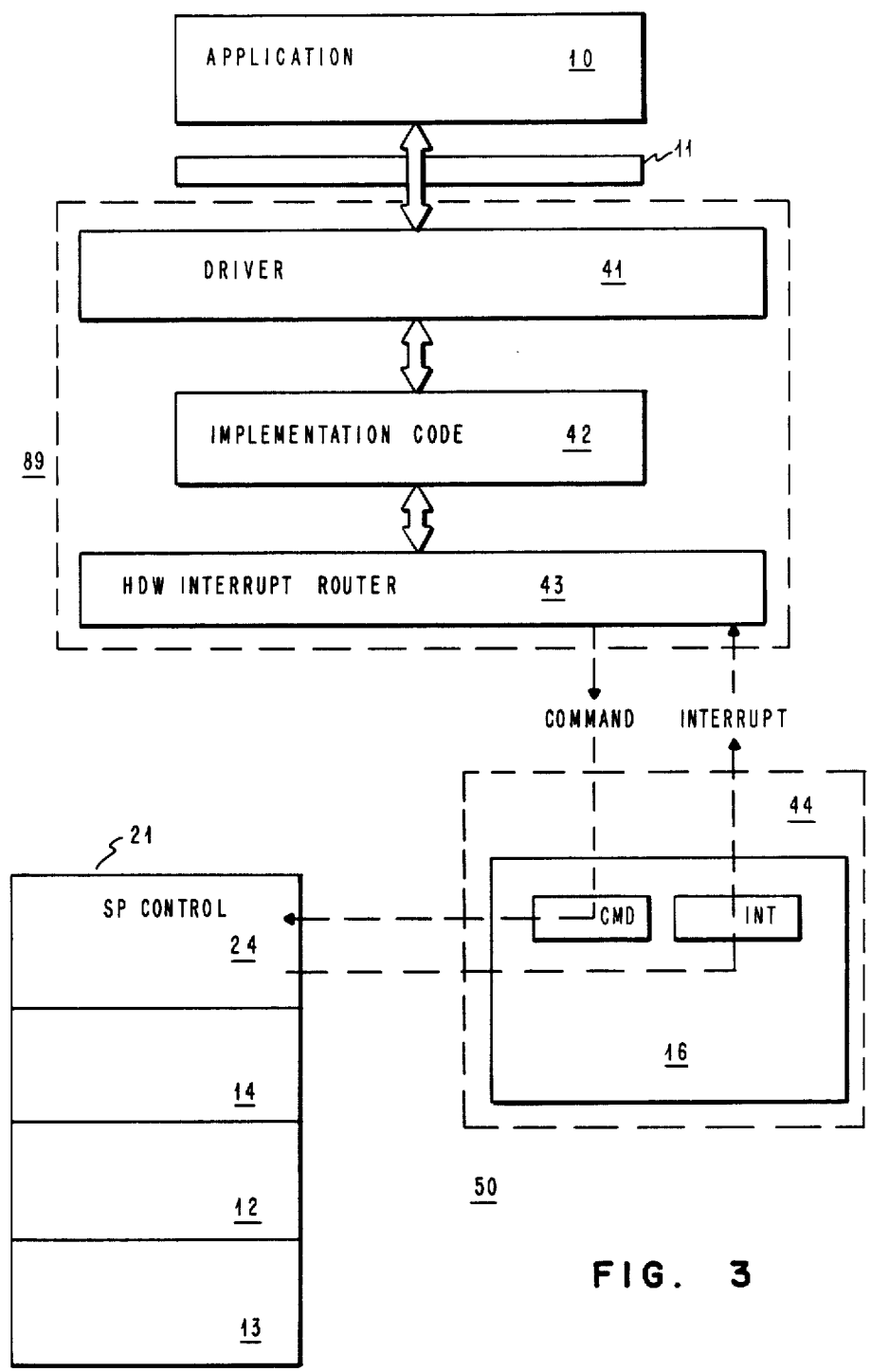
FIG. 3 is a functional block diagram of the overall system of the present invention.

FIG. 3 shows in simplified functional block form the flow of commands and interrupts. Application 10 interacts across the programming interface 11 with driver 41, implementation code 42 and hardware interrupt router 43, each of which is located in host processing system 89. Hardware interface 44 forms the boundary between host processing system 89 and signal processing system 50. Application commands terminate in partition 24 of instruction memory 21, while interrupts originate in partition 24. Partition 24 contains the signal processor control program. This control program manages instruction memory 21 in partitions 12, 13, and 14 and allows the signal processing code in partitions 12, 13, and 14 to run concurrently, thereby sharing the resources of the signal processing system 50. The flow of commands and interrupts which define programming interface 11 will now be explained in more detail with reference to FIGS. 4 & 5.

Figure 4:
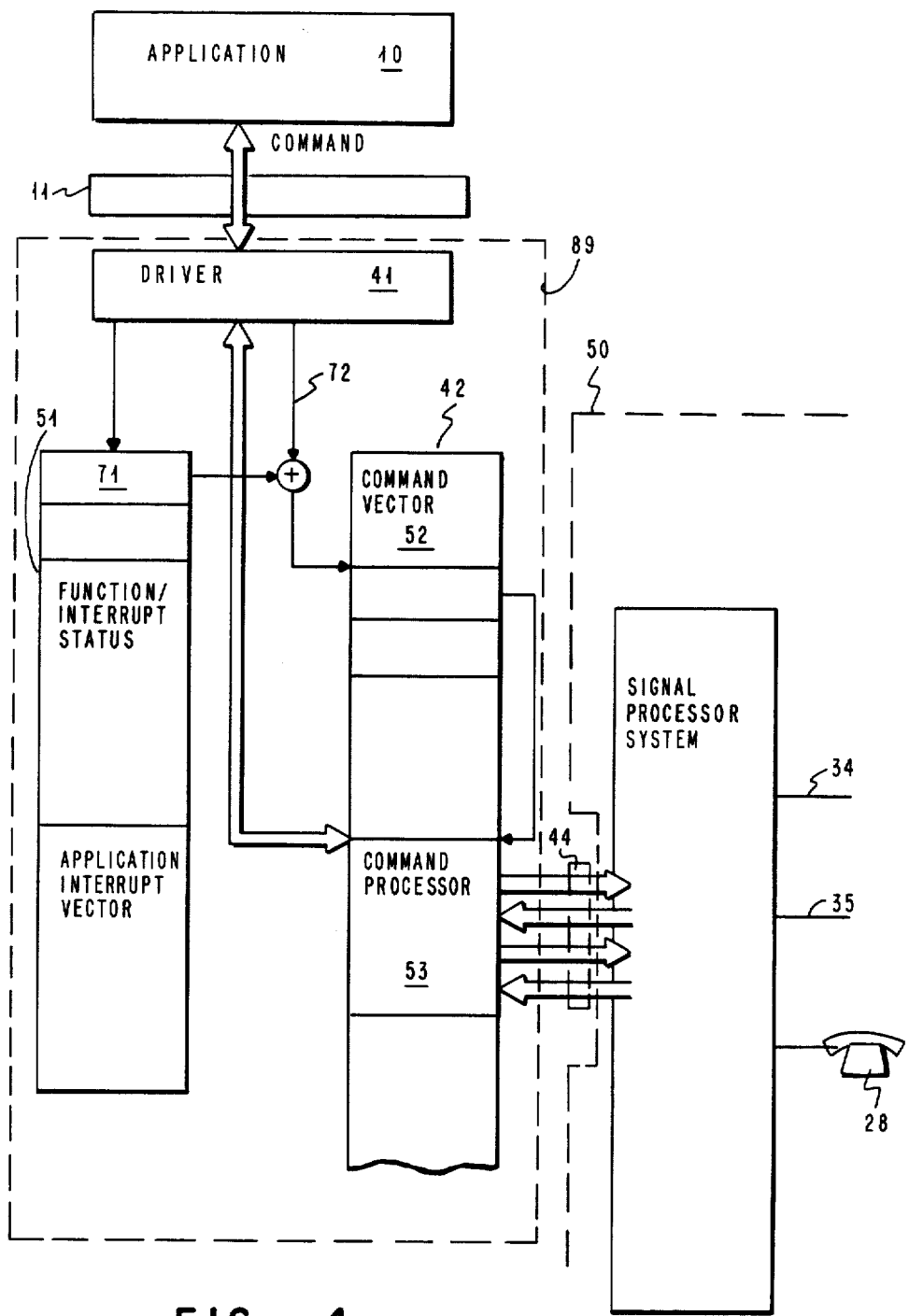
FIG. 4 is a simplified block diagram demonstrating the flow of commands from an application program across the programming interface through the host processing system to the signal processing system.

FIG. 4 details the flow of commands from application 10 across interface 11 through host 89 and to signal processing system 50. The commands which are input from application 10 to interface 11 contain two types of identification. The first type of identification provided is the function set that is to be used and this identification selects the appropriate control block 51 which in turn accesses the implementation code 42. The second type of identification is of the particular command within a given function set. The driver 41 takes these commands and then passes them on to the appropriate locations in implementation code 42. The select control block information which is part of the command input to interface 11 and driver 41 identifies a particular control block 51. This control block 51 contains a pointer block 71 which points to the beginning of command vector block 52. The command code information contained in the command is output over line 72. Together with the pointer information from pointer block 71, the command code points or indexes to the particular location in command vector 52 to which this command is pertinent. After execution, command vector 52 points to a specific piece of implementation code in command processor 53. Having found the particular piece of code required, driver 41 then passes control to this command processor 53 which contains this required code. In effect, command vector 52 along with the command code issued over line 72 and pointer block 71 perform an addressing function. Command processor 53 then implements the particular command which has been output from application 10 to signal processor system 50.

Figure 5:
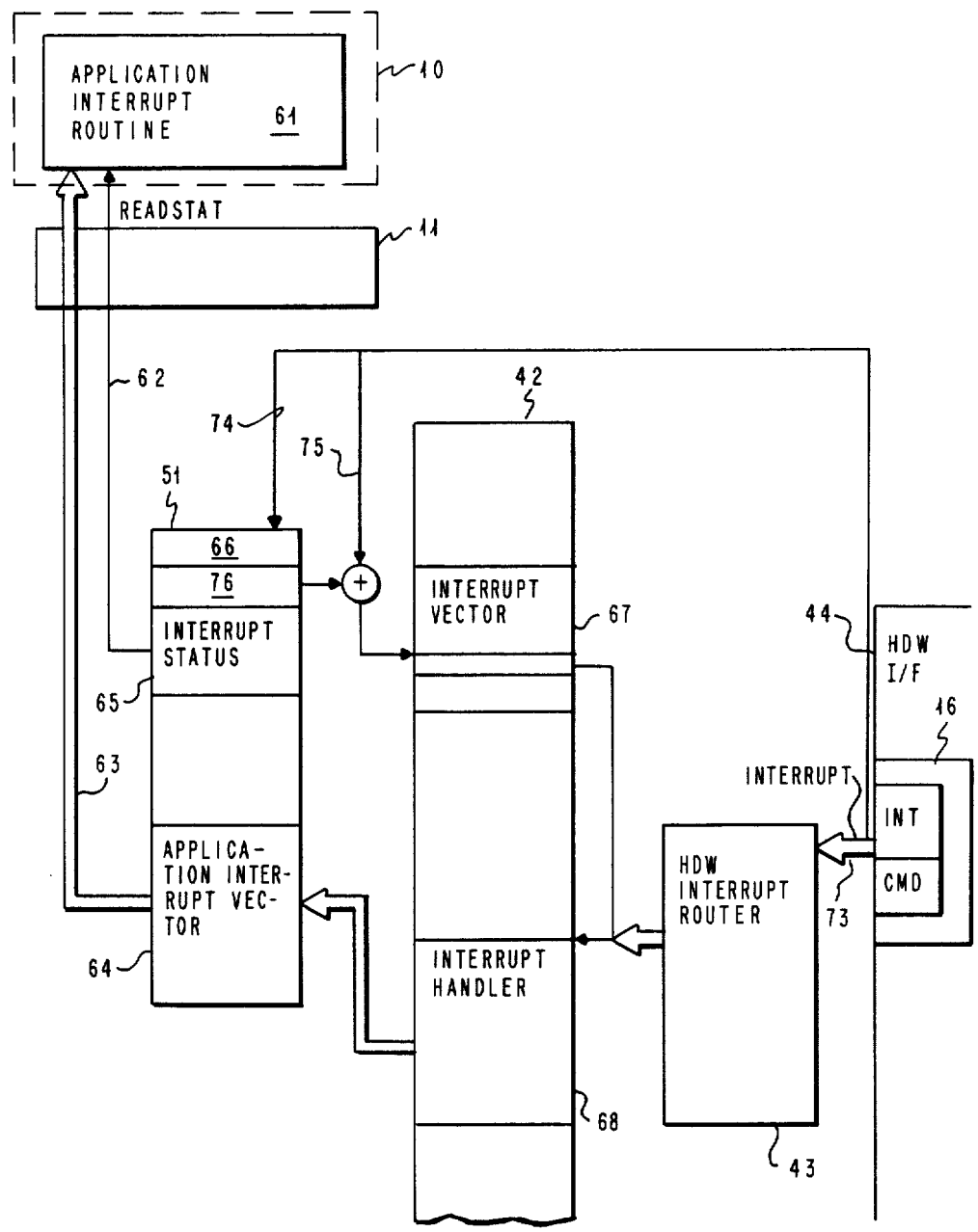
FIG. 5 is a simplified block diagram demonstrating the flow of interrupts from the signal processing system and through the host processing system back to the logic of application program.

FIG. 5 provides in more detail the flow of interrupts from signal processing system 50 back through host 12 to interface 11 and then to application interrupt routine 61 within application 10. An interrupt is generated by signal processing system 50 and output across hardware interface 44 to hardware interrupt router 43 over line 73. The interrupt contains both partition information on line 74 and information as to the type of interrupt. The partition information is used to identify control block 66, which contains pointer 76 which points to the starting point of interrupt vector 67. The type of interrupt is input over line 75. Together with pointer 76, the correct point in interrupt vector block 67 is accessed. After execution, interrupt vector 67 points to the entry point in interrupt handler 68. Hardware interrupt router 43 then routes the interrupt to the interrupt handler 68. Interrupt handler 68 then executes and passes the interrupt up to application interrupt routine 61 through application interrupt vector 64. The information provided on line 63 to application interrupt routine 61 contains information as to which interrupt is coming and gives application 10 control to process the interrupt. After control has been given to application 10, a read status command is output from application 10. The read status information is then input over line 62 from interrupt status block 65 to application interrupt routine 61. This signal provides more information regarding the interrupt which has just been sent and informs application interrupt routine 61 of all interrupts that have taken place since the previous read status command. The interrupt status block 65 is updated by interrupt handler 68 each time interrupt handler 68 is accessed by hardware interrupt router 43.

A function set, such as the telephony or line monitoring sets, comprises two software files. One file is for the host processing system 89, while the other file is for the signal processing system 50. When a function set is activated, both files are loaded into the memory of host 89 and then the signal processing code is downloaded into instruction memory 21. This downloading is basically a memory to memory move performed by base partition 14. This downloading may be performed while one of the other partitions, either 12 or 13 is executing.

Any application program that needs to use any resources available from signal processing system 50 must compete for access to these resources with an OPEN function. Signal processing system 50 allows a limited degree of concurrency, i.e., a limited number of applications will be allowed to access the system simultaneously. In the preferred embodiment, four applications can be running concurrently. With this limit, for example, two applications can be using partitions 12 and 13 of instruction memory 21 independently. This might occur when partition 12 is being used to place a telephone call at the same time that partition 13 is being used for speech recognition. Additionally, one or two applications can be using the two ring-in interrupts at the same time on lines 34 and 35. If the number of allowed concurrent applications is not exceeded, then the OPEN function is successful and the identification (ID) of a resource control block (RCB) is returned to the application seeking the resources. The RCB is used to identify the application and to indicate what resources the application requires. Any request for resources is made by presenting the RCB to the signal processing system 50. Analogously to the resource control block, there is a system control block (SCB) which provides an indication as to whether a given resource has been allocated to some other RCB or whether the resource is still available for allocation.

Three functions are provided by the signal processing system 50 to allow an application to obtain the hardware or interrupt resources that it requires to execute. The first function is a read hardware (READ HDW). The READ HDW function contains two operands, the owned hardware and available hardware operands. These two operands indicate, respectively, what resources the requesting RCB owns, and what resources are currently available, i.e., no RCB owns that resource. This latter information is provided by the system control block. The READ HDW function also contains the requesting RCB identification number as one of its operands. The second function provided by signal processing system 50 is a claim hardware (CLAIM HDW) function which contains an RCB as a first operand and a hardware operand by which the application seizes the resources required by the RCB of the application. The requesting application receives these resources even if they have to be stolen from other RCBs. Each RCB that has a resource stolen from it in this manner, is provided with a "hardware stolen" interrupt to warn it of this event. The RCB that had a resource stolen then has all of its other hardware resources returned to signal processing system 50.

In this environment, a user is allowed to start an application that preempts the resources currently being used by another application. The newly started application uses the READ HDW function to warn the user of the preemption. If the user decides to proceed, then the CLAIM HDW function is used to seize the required resources by the identified RCB of the application. Note that the preempting application cannot use any resources until they have been claimed by the CLAIM HDW function.

The final function provided by signal processing system 50 to allocate and control RCBs is the free hardware (FREE HDW). This function allows an application to return any or all of its resources to signal processing system 50 for use by other applications. The FREE HDW function identifies the RCB freeing the resources and specifies which resources are being freed. When an application terminates, it releases its claim on the signal processing system 50 using a CLOSE function. This function returns the RCB to the signal processing system 50 and frees any hardware resources that the RCB may still own. In this manner, all the resources associated with this RCB become available once again to signal processing system 50 for any other applications. The freeing of resources also includes the interrupt resources.

Figure 6:
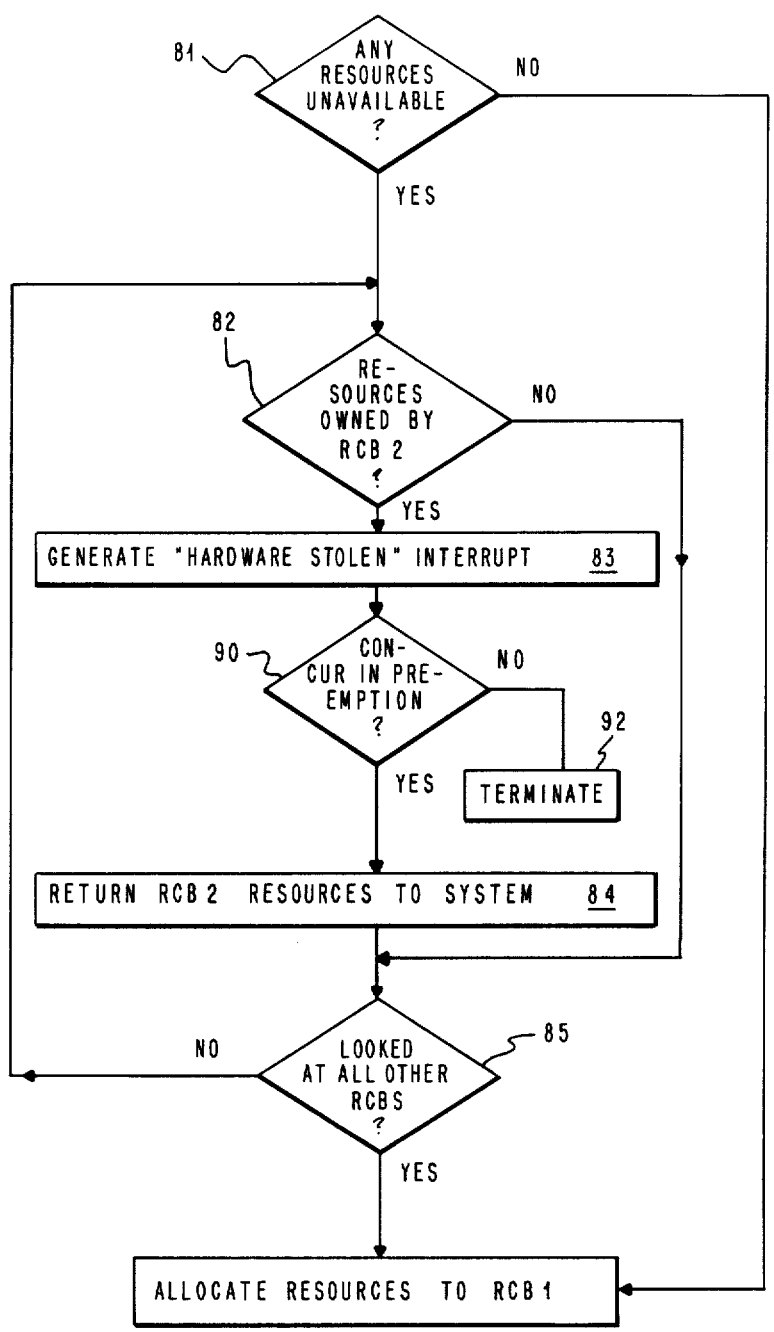
FIG. 6 is a flow chart depicting the allocation of resources to a requesting application.

The logic of the operation by the function sets CLAIM HDW, FREE HDW, and READ HDW, is shown in FIG. 6. This flow chart assumes that RCB 1 is the one requesting resources which are currently owned by RCB 2. RCB 1 will preempt RCB 2. In step 81, a determination is made as to whether any of the resources required by RCB 1 is unavailable. If all of the resources are available, then the requested resources are allocated to RCB 1. However, if there are resources unavailable then in step 82, a determination is made as to whether or not the required resources are owned by RCB 2. If they are not, then the logic branches to step 85 where all other currently active RCBs are examined. If, however, the required resources are owned by RCB 2, as indicated at block 83, the application using RCB 2 resources is warned of the impending deallocation of resources. The logic determines that decision, block 90, whether the application which receive the warning concurs in the preemption of its resources. If so, logic continues to step 84 where the resources associated with RCB 2 are returned to the system. However, if the user wants to let the already executing application complete before the application which requires its resources begins as indicated by a no, the subsequent application is terminated, indicated in step 92. After all other RCBs have been examined as indicated in step 85, then the requested resources are allocated to RCB 1 for execution with the requesting application.

While the invention has been particularly shown and described with reference to a preferred signal processing system embodiment therein, it will be understood by those skilled in the art that various other changes in form and detail may be made without departing from the spirit and scope of the invention.

What we claim is:

1. An interactive information processing system comprising:
   a host processor;
   a signal processor system connected to said host processor and controlled by said processor to access a plurality of system resources;
   a plurality of application programs executable by said host processor requiring concurrent usage of at least one of said plurality of system resources;
   data memory means dynamically shared by said host and signal processors for containing a plurality of resource control blocks, each of said resource control blocks being associated with a given one of said plurality of application programs;
   a system control block means in said data memory means for maintaining use status of each of said plurality of system resources;
   means in said host processor for storing in each of said resource control blocks an indication of which of said plurality of system resources are required for its associated application program;
   command means in each of said plurality of application programs executable by said host processor for comparing its resource control block and said system control block for determining availability of system resources;
   means in said host processor operable when said command means for comparing indicates system resource availability for allocating said system resources to an application program;
   default means in said host processor, operable when said command means for comparing indicates resources in use by another prior executing application program, for suspending execution of said another application program and allocating said resources in use by said another prior executing application program to an application program subsequently requesting said resources, said default means including interrupt means for interrupting said prior executing application program to alert said prior executing application program of an impending deallocation of resources; and
   interactive means in said another prior executing application program for overriding said default means by terminating execution of a subsequently initiated application program,
   whereby a user of said interactive information processing system may interact with said system to alter execution sequence of said application program.

2. The system of claim 1 wherein said system resources include at least one telephone line, a telephone, a microphone and a speaker and a plurality of interrupt handling resources including at least one ring in interrupt and a telephone on/off cradle interrupt.

3. The system of claim 2 wherein said system resources further comprise a plurality of ports operatively connected to said at least one telephone line and to said telephone said microphone and said speaker.

4. The system of claims 1 or 3 additionally comprising:
   an instruction memory comprising at least three partitions, a first partition containing code for providing signal processing system control, a second partition containing one of a telephony function set or line monitoring function set, and a third partition containing any one of a plurality of function sets providing respectively, audio input and output, speech synthesis, speech recognition or asynchronous communication.

5. The system fo claim 4 wherein said instruction memory additionally includes a fourth partition in which commands from an application program terminate, interrupts originate, and instruction memory management code resides.

6. The system of claim 5 additionally comprising:
   means bidirectionally connecting said host and signal processors;
   means for mutually exclusively accessing said instruction memory by said host and said signal processors.

7. The system of claim 6, additionally including:
   means in said data memory for communicating commands input from an application program said instruction memory; and
   means for communicating interrupts from said signal processor control program in said instruction memory to said application program.

* * * * *

UNITED STATES PATENT AND TRADEMARK OFFICE
CERTIFICATE OF CORRECTION

PATENT NO. : 4,750,116

DATED : June 7, 1988

INVENTOR(S) : Xuan N. Pham et al

It is certified that error appears in the above-identified patent and that said Letters Patent is hereby corrected as shown below:

Col. 8, Claim 5, line 47, delete "fo" and insert therefor --of--;

Claim 7, line 60, after the word "program" insert --to--.

Signed and Sealed this

Twenty-third Day of June, 1992

Attest:

DOUGLAS B. COMER

Attesting Officer

Acting Commissioner of Patents and Trademarks